(12) United States Patent
Heyde

(10) Patent No.: US 6,325,205 B1
(45) Date of Patent: Dec. 4, 2001

(54) APPARATUS FOR CONVEYING ARTICLES

(75) Inventor: Hans Heyde, Wallenhorst (DE)

(73) Assignee: Sollich KG, Bad Salzuflen (DE)

( * ) Notice: Subject to any disclaimer, the term of this patent is extended or adjusted under 35 U.S.C. 154(b) by 0 days.

(21) Appl. No.: 09/561,711

(22) Filed: May 1, 2000

(30) Foreign Application Priority Data

May 3, 1999 (DE) ............................................ 199 20 068

(51) Int. Cl.⁷ ................................................. B65G 23/04
(52) U.S. Cl. ........................................... 198/835; 198/848
(58) Field of Search ....................................... 198/834, 848

(56) References Cited

U.S. PATENT DOCUMENTS

| | | | |
|---|---|---|---|
| 527,723 | * 10/1894 | Sargent et al. | 198/834 |
| 2,591,987 | * 4/1952 | Werden | 198/848 |
| 3,859,865 | * 1/1975 | Conrad | 198/834 |
| 4,685,557 | * 8/1987 | Roinestad | 198/834 |
| 4,865,183 | 9/1989 | Hodlewsky et al. | 198/834 |
| 5,156,263 | * 10/1992 | Ledet | 198/834 |
| 5,816,988 | 10/1998 | Daringer et al. | 492/33 |
| 5,950,807 | * 9/1999 | Greer | 198/848 |
| 6,086,495 | 7/2000 | Stebnicki et al. | 474/96 |

FOREIGN PATENT DOCUMENTS

| | | | |
|---|---|---|---|
| 3839440 C1 | 11/1988 | (DE) | A23G/3/20 |
| WO98/37000 | 8/1998 | (WO) | |

* cited by examiner

Primary Examiner—Joseph E. Valenza
(74) Attorney, Agent, or Firm—Thomas, Kayden, Horstemeyer & Risley LLP

(57) ABSTRACT

An apparatus for conveying articles, especially sweets to be covered with a chocolate mass or a similar mass, includes a grid belt (1) including a plurality of straight bar portions (8) extending in a transverse direction with respect to a conveying direction (2). A plurality of meshes (9) interconnects the straight bar portions (8). A drive shaft (3) includes a plurality of gear wheels (4) being designed and arranged to engage the straight bar portions (8) and including disk-like enlargements (11) being located in a transverse direction with respect to the conveying direction (2) and in the region of the meshes (9). The disk-like enlargement (11) are designed and arranged to support the meshes (9). A motor is operatively connected to the drive shaft (3), and it is designed and arranged to drive the drive shaft (3) and to move the grid belt (1) in the conveying direction (2).

20 Claims, 5 Drawing Sheets

APPARATUS FOR CONVEYING ARTICLES

CROSS REFERENCE TO RELATED APPLICATIONS

This application claims the benefit of co-pending German Patent Application No. 199 20 068.8 entitled "Fördereinrichtung für Warenstücke, insbesondere für mit Schokolademasse zu überziehende Süßwarenstücke" filed on May 3, 1999.

FIELD OF THE INVENTION

The present invention generally relates to an apparatus for conveying articles. More particularly, the present invention relates to an apparatus for conveying articles to be covered with a chocolate mass or a similar mass including a grid belt being driven by a motor to transport the articles in a conveying direction.

BACKGROUND OF THE INVENTION

Usually, apparatuses for conveying articles, especially for conveying sweets to be covered with a chocolate mass, are used in combination with a treating apparatus, especially a coating apparatus, in which the surfaces of the articles are covered with a chocolate mass, a different mass containing cacao butter or a similar fat containing mass. The articles may especially be bars. The essential element of the conveying apparatus is a grid belt. It is important that the grid belt includes a surface having openings on which the articles are supported to be conveyed through the treating apparatus. The openings of the grid belt allow for the chocolate mass and other coating masses to penetrate through the grid belt in a downward direction following gravity, to be collected and to be pumped through the circuit, again. Such conveying apparatuses including a grid belt are used in different treating apparatuses for articles. For example, they are used in the food processing industry to transport cookies and the like. In this case, the grid belt including openings allows for a different medium than chocolate mass, for example warm air, to penetrate through the grid belt and to flow about the surfaces of the cookies.

A coating apparatus for coating articles with a chocolate mass is known from German patent No. 38 39 440 C1. The coating apparatus includes a conveying apparatus including a grid belt. The endless grid belt is guided about a drive shaft and about one or more deflecting axes. The drive shaft includes gear wheels. The gear wheels with their teeth engage the grid belt to move the grid belt in the conveying direction.

Grid belts made of a web of steel are commonly known in the art. The web of steel includes a majority of bars substantially extending in a transverse direction with respect to the conveying direction of the grid belt Each single bar has a plurality of Z-shaped angled deformations. Usually, wire having a circular cross section is used for the web of steel and for the bars, respectively. Such a bar includes and forms, respectively, a majority of straight bar portions extending in a direction transverse with respect to the conveying direction. Additionally, there are U-shaped meshes with their slightly transverse oriented legs extending approximately in the conveying direction. The single adjacent bars are interconnected such that the endless grid belt is formed. Usually, it is sufficient to provide one drive shaft. The drive shaft is used in combination with a plurality of deflecting axes. The deflecting axes may include deflecting wheels. A motor is fixedly connected to the drive shaft. There may be a transmission. The gear wheels are arranged on the drive shaft such that they exclusively engage the straight bar portions of the web of bars to transmit torque necessary for the movement of the grid belt in the conveying direction. The legs of the meshes extend at a certain distance latterly from the gear wheels. The gear wheels usually engage the pulling bar portions of the grid belt. The lifetime of such a grid belt made of a web of steel is limited. The grid belt and the single bars of the web of bars, respectively, are subjected to bending forces during operation of the conveying apparatus. Due to forces being transmitted in the lateral periphery of the gear wheels, the bars are subjected to changing bending forces. The bars are bent at the same location again and again. Accordingly, there is the danger of fatigue fractures and repeated stress failures of the grid belt. Such fractures of the grid belt require a stop of the production until the grid belt has been removed and a new grid belt has been assembled, or until the broken grid belt has been fixed. Losses due to necessary stops of the production may be substantial.

Gear wheels having a deep continuous centered channel to prevent the danger of impurities accumulating in the deepenings between teeth in the center of the teeth are also known in the art. The gear wheels are designed to be smaller than the width of the straight bar portions of the web of steel such that the legs of the meshes extending in the conveying direction are located at a distance with respect to the faces of the gear wheels. The channel does not reduce the danger of fatigue fractures.

SUMMARY OF THE INVENTION

Briefly described, the present invention provides an apparatus for conveying articles. The apparatus includes a grid belt including a plurality of straight bar portions extending in a substantially transverse direction with respect to the conveying direction. A plurality of meshes interconnects the straight bar portions. A drive shaft includes a plurality of gear wheels being designed and arranged to engage the straight bar portions and including disk-like enlargements being located in a transverse direction with respect to the conveying direction and in the region of the meshes. The disk-like enlarged sections or enlargements are designed and arranged to support the meshes. A motor is operatively connected to the drive shaft, and the motor is designed and arranged to drive the drive shaft and to move the grid belt in the conveying direction.

The present invention is based on the concept of not only supporting the straight bar portions in the region of the gear wheels, but also to support the meshes being located between the straight bar portions. Consequently, the one point support of the grid belt known in the prior art is replaced by a novel two point support. The straight bar portions extending in a transverse direction with respect to the conveying direction are supported by the gear wheels in an outer region, meaning in a region close to the meshes. Additionally, the apparatus includes disk-like or cylinder-like enlargements, protrusions, thickenings or the like extending in axial direction of the drive shaft into the regions in which the meshes are located. The meshes are supported by the enlargements. The two points of support are located comparatively close to one another, but at the same time in a spaced apart manner such that reversed bending forces having an effect on the bar are substantially reduced. As a result, lifetime and usable operational time of the conveying apparatus and of the grid belt, respectively, are increased. A two point support is attained at each side of a gearwheel and of a straight bar portion, respectively, the two point support encompassing one of the U-shaped legs of a mesh. Thus, bending effects of the straight bar portions are substantially reduced. This leads to the straight bar portions better contacting the teeth of the gear wheels and contacting the teeth of the gear wheels with an increased surface such that friction losses are substantially reduced compared to conveying devices known in the prior art including a known grid belt.

The disk-like enlargements or protrusions may be located at both sides of a gear wheel. This means that a first enlargement is arranged at a first side of the gear wheel, and a second enlargement is arranged at the second side of the gear wheel. In this embodiment, the axial length of the gear wheel and of the body of the gear wheel, respectively, is chosen such that the straight bar portion is engaged by the lateral periphery of the gear wheel or by the body of the gear wheel to achieve a large support. Consequently, the corresponding mesh is supported at both ends of a straight bar portion. It is to be understood that the gear wheels usually engage the pulling bar portions of the bars, while the pulled bar portions are free from engagement. A corresponding number of gear wheels and of straight pulling bar portions is arranged along the width of the grid belt. Such a gear wheel or a corresponding gear wheel body in its center region may include a channel reducing its diameter. Since driving forces are not transmitted in the center region of a straight bar portion, the channel may reduce the weight of the gear wheels and of the gear wheel bodies, respectively.

In another exemplary embodiment of the novel conveying apparatus, the disk-like enlargements are only arranged at one side of a gear wheel. Such a gear wheel only engages one end portion of a straight bar portion, while the corresponding enlargement supports the adjacent mesh. Another gear wheel including an enlargement may be arranged mirror-symmetrically in the region of the same straight bar portion.

In all exemplary embodiments, the disk-like enlargements may have an outer diameter being smaller than or identical to the root diameter of the gear wheel. The design of the diameter of the enlargement depends on the design of the bars of the grid belt, and especially on the dimensions of the mesh being located between the straight bar portions. The fact whether or not the pulled straight bar portions of the prearranged bar are in alignment with the pulling straight bar portions of the following bar also depends on the dimensions and on the design of the mesh. Usually, there is a small offset corresponding to the diameter of the wire.

It is especially advantageous if two gear wheels each including one enlargement at one side are provided for the region of one straight bar portion with its two meshes. The two gear wheels may be designed and arranged to be adjustable with respect to one another in a direction transverse to the conveying direction. This embodiment has the advantage of the gear wheels being adjustable with respect to the arrangement of the meshes at the straight bar portions. Consequently, it is possible to engage the straight bar portions close to their ends. In other words, there is a small distance to the meshes. In this way, the tolerances occurring when the bars are bent are compensated.

The disk-like enlargements being located at the gear wheels usually have a cylindrical design. This means that they have a smooth cylindrical surface. Another possibility of designing the novel apparatus and to support the meshes is to arrange impressions at the circumference of the enlargements. Corresponding to the arrangement of the bars of the grid belt, these impressions are arranged about the circumference, and they are adapted to the diameter of the wire of the bars such that the meshes are locally supported in an impression.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
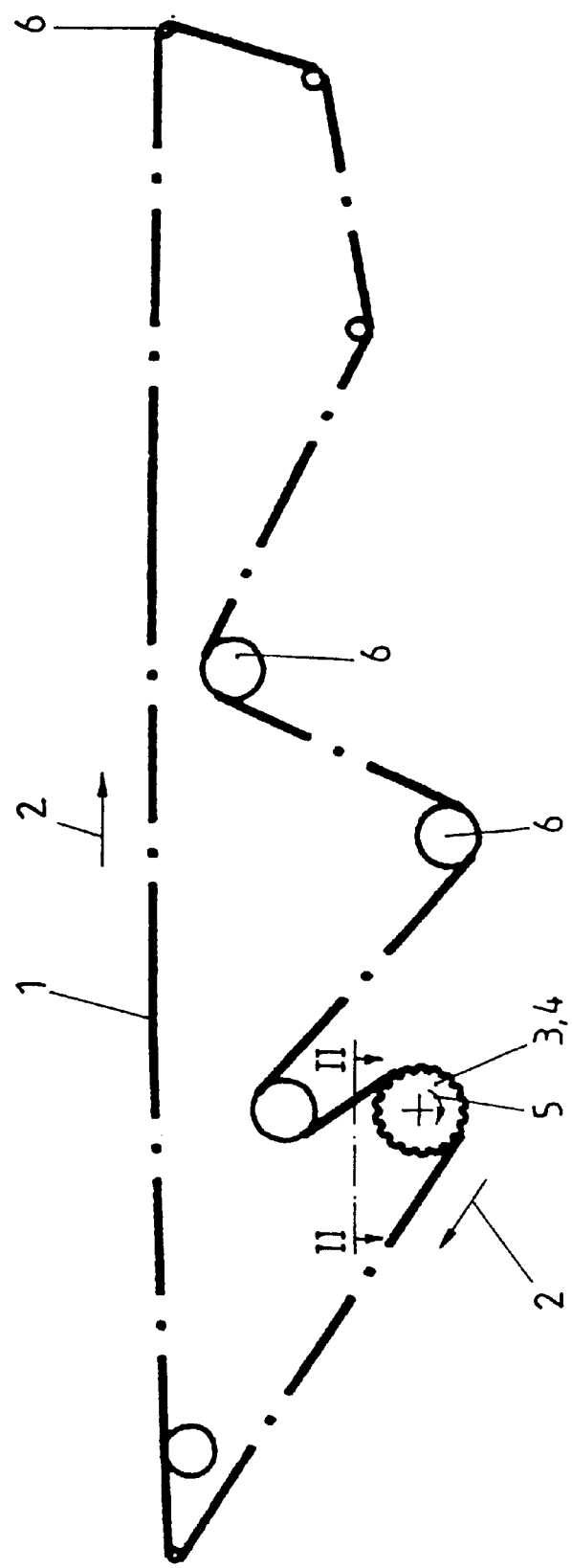
FIG. 1 is a schematic side view of the guidance of a grid belt.

Referring now in greater detail to the drawings, FIG. 1 schematically illustrates a grid belt 1 by a dash-dotted line. The grid belt 1 is moved by a drive shaft 3 in the conveying direction 2. The drive shaft 3 includes gear wheels 4, and it is driven according to arrow 5. The grid belt 1 is designed as an endless belt in a known way, and it is deflected by a number of deflecting axes 6. The deflecting axes 6 may be preferably designed as knives. It is to be understood that the articles to be transported by the grid belt 1 are only located on the upper portion of the grid belt 1. For example, the articles are transported through a coating apparatus.

Figure 2:
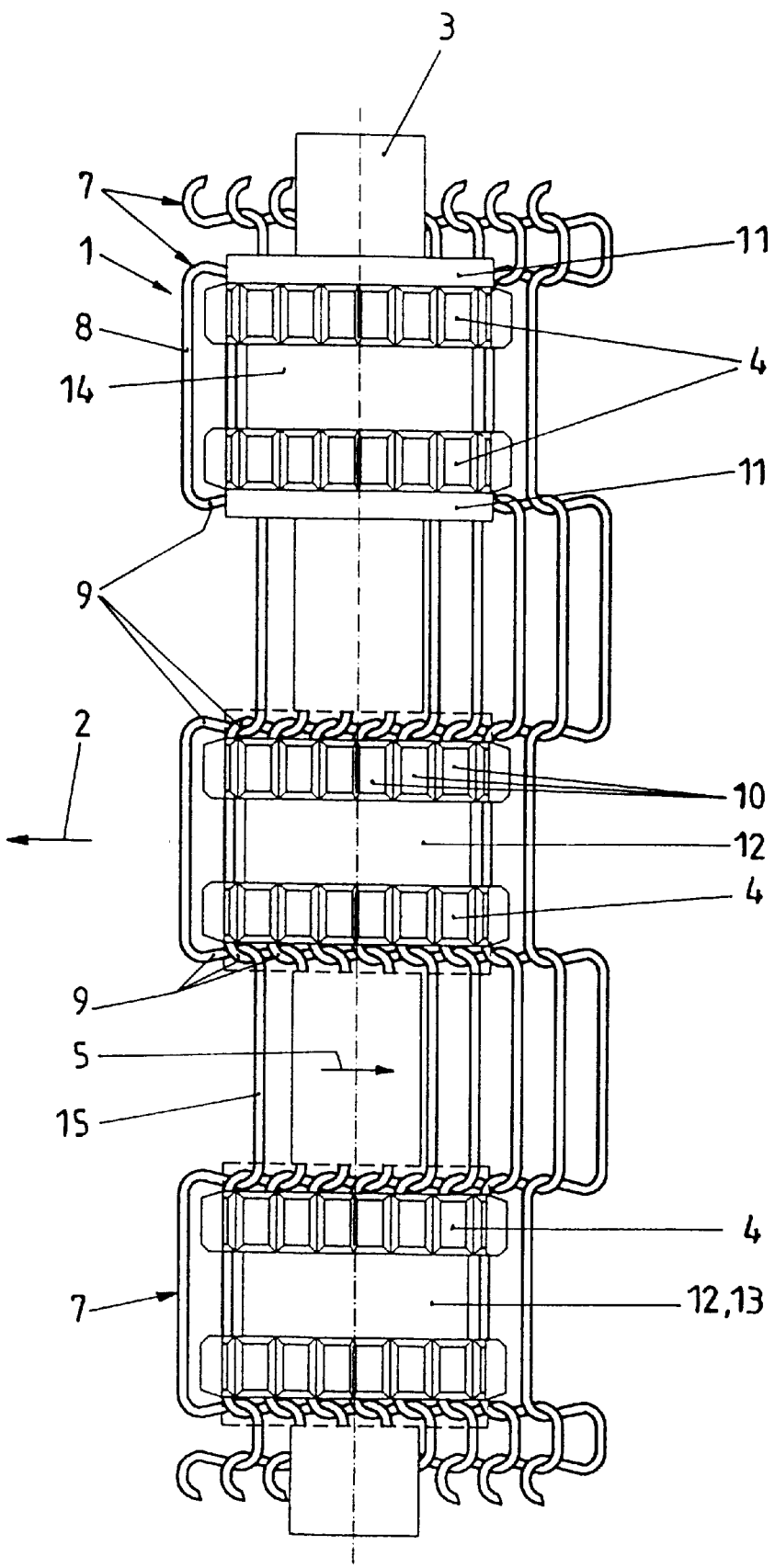
FIG. 2 is atop view of a drive shaft and of the grid belt according to line II—II in FIG. 1.

FIG. 2 illustrates a top view from above according to arrow II—II in FIG. 1. Accordingly, only a portion of the grid belt 1 being located below the drive shaft 3 with its gear wheels 4 is illustrated. This is at least true to the upper portion of the illustration of FIG. 2. The drive shaft 3 is driven in the direction according to arrow 5. Consequently, the grid belt 1 being located below the drive shaft 3 fulfills a movement in the conveying direction 2.

The grid belt 1 is made of a web of bars or rods. Each bar 7 includes straight portions 8 and meshes 9. The portions of the bars 7 approximately extending in the direction of the axes of the drive shaft 3 and contacting the gear wheels 4 are designated as straight portions 8. The gear wheels 4 with their teeth 10 transmit forces onto the grid belt 1. The portions of the bars 7 being substantially directly connected to the straight portions 8 and extending approximately perpendicular or slightly inclined with respect to the axes of the drive shaft 3 are designated as meshes 9. These meshes 9 also serve to connect adjacent bars 7. Additionally, each bar 7 includes a corresponding number of straight portions 15 being located further in the rear. The straight portions 15 do not transmit forces, and they are of no special interest to the present invention.

It is essential that the gear wheels 4 include disk-like enlargements 11. The enlargements 11 are arranged in the region of the grid belt 1 where the meshes 9 are located. The enlargements 11 or enlarged sections serve to support the meshes 9. The kinking of the meshes 9 of adjacent bars 7 is illustrated in the lower portion of FIG. 2 to better explain the course of the meshes 9 and the mutual engagement of adjacent bars 7 of the grid belt 1. The enlargements 11 being located in this region are only depicted by a dash-dotted line. Consequently, the enlargements 11 are broken away at this location, and one sees the interlaced meshes 9 of the grid belt 1 being located below the drive shaft 3. It is to be seen from FIG. 2 is that a body 12 is fixedly connected to the drive shaft 3 in the region of a bar-like straight bar 8. Each body 12 carries two gear wheels 4 being connected to the gear wheel 4 such that they are not arranged in the middle region of the bar 8, and such that there is an engagement in the end portions of the bar 8 and in a region close to the meshes 9. It is desired to transmit forces in an outward region of the bars 8 or the bar portions 8, meaning in a region being close to the meshes 9. In this way, there are considerably low reversed bending stresses acting upon the bars 7. For this reason, the middle portion 13 of the gear wheels 4 has a decreased diameter, or it includes a continuous channel 14, respectively. The enlargements 11 have an outer diameter 16 being slightly smaller than the root diameter of the gear of the gear wheels 4 and of the teeth 10, respectively.

Figure 7:
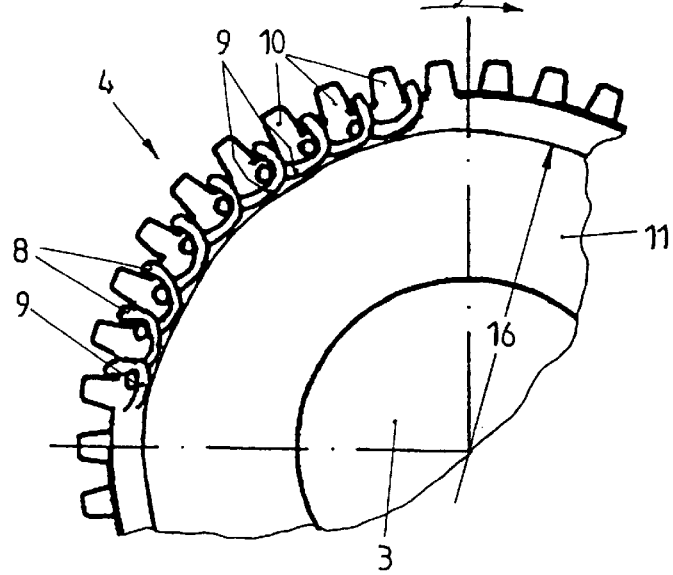
FIG. 7 is a side view of a gear wheel illustrating the relative position of the elements of the grid belt.

It is to be seen from FIG. 7 that each mesh 9 is supported on the enlargements 11 such that the circumferential force is transmitted to the straight bars 8 exclusively or substantially by the teeth 10 of the gear wheels 4. Due to the meshes 9 being supported on the circumferential surface of the enlargements 11 and due to the friction acting between the elements, the reversed bending stresses acting upon the grid belt 1 are substantially reduced at this location. Consequently, the lifetime of the apparatus is increased.

Figure 3:
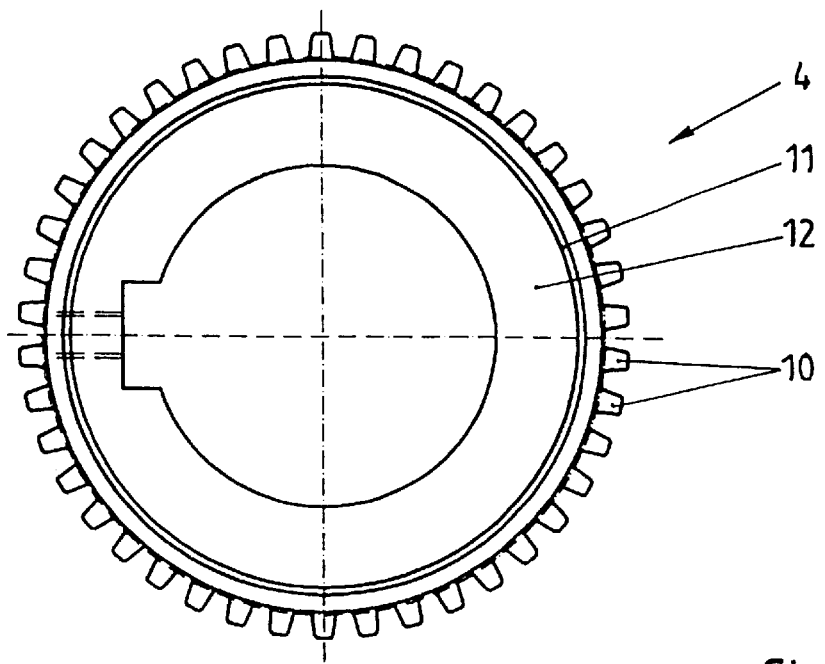
FIG. 3 is a side view of a gear wheel according to the embodiment illustrated in FIG. 2.
Figure 4:
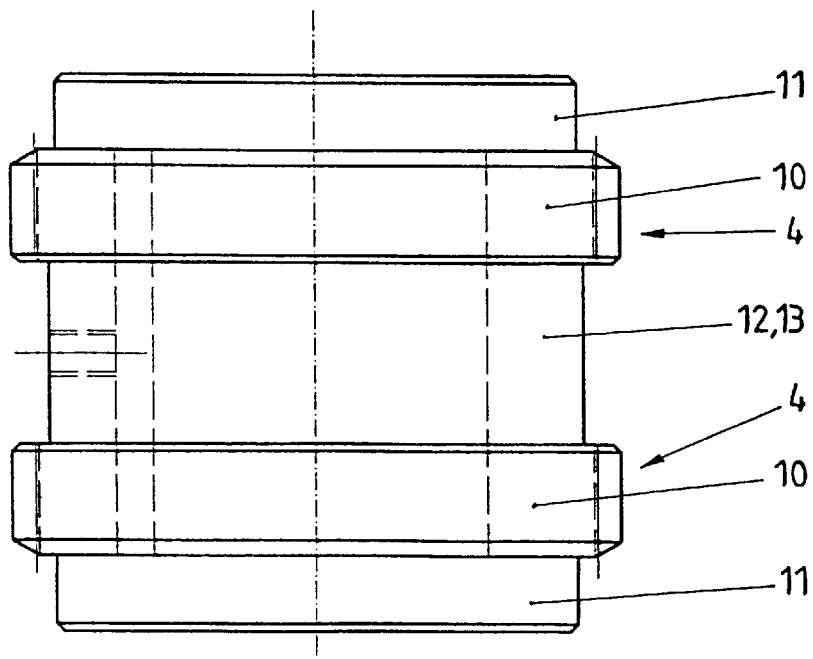
FIG. 4 is a top view of the gear wheel according to FIG. 3.

FIGS. 3 and 4 illustrate a first embodiment of the gear wheels 4 including the novel enlargements 11. Two gear wheels 4 are arranged at one common body 12. One enlargement 11 is connected to the body 12 and to the gear wheels 4, respectively, to both sides.

Figure 5:
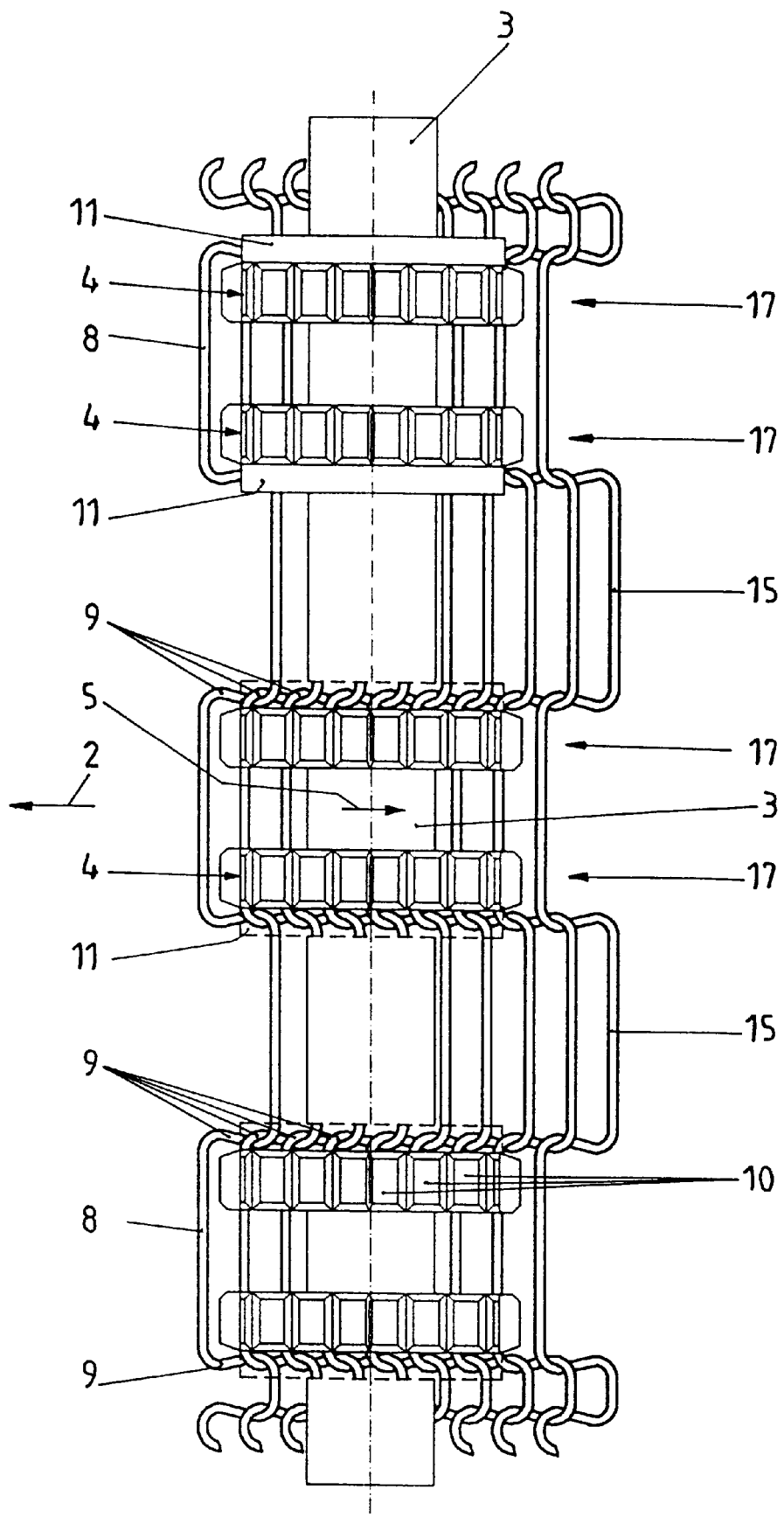
FIG. 5 is a similar view as FIG. 2, but illustrating a second embodiment of the drive shaft.

FIG. 5 is a similar illustration as FIG. 2, but illustrating a second exemplary embodiment. In this embodiment, there are separate units 17 each being separately connected to the drive shaft 3, and each being fixedly connected therewith to be commonly rotated. Each unit 17 includes a gear wheel 4 to which one enlargement 11 is connected to one side.

Figure 6:
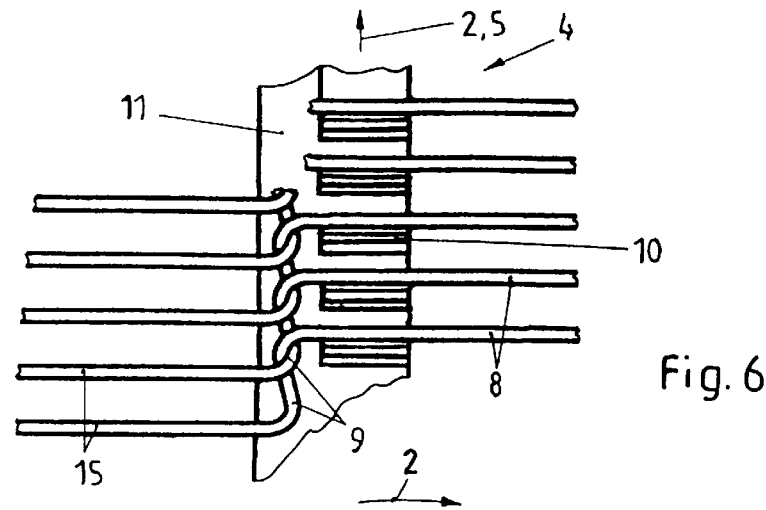
FIG. 6 is a rolled down view depicting the engagement of the teeth and the support of the meshes.

FIG. 6. illustrates the teeth 10 engaging the straight bar portions 8 and the meshes 9 being supported by the enlargements 11 in a top view as unrolled into the plane of illustration.

Figure 8:
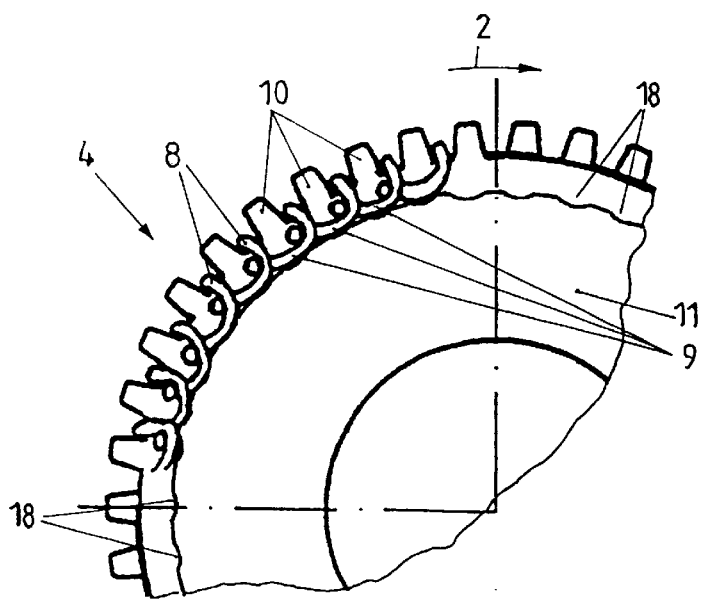
FIG. 8 is another view similar to FIG. 7, but illustrating another embodiment of the invention.

FIGS. 7 and 8 in a top view of the face surface including the enlargements 11 illustrate a side view of a gear wheel 4 having teeth 10. The gear wheels 4 are driven according to the conveying direction, and they transmit forces to the grid belt 1 and to the bars 8, respectively. It is to be seen from FIGS. 7 and 8 how the meshes 9 with their other diameter 16 are supported on the circumference of the enlargements 11. To not only use static friction as this is the case in FIG. 7, the circumference of the enlargements 11 may include impressions 18 (FIG. 8) form fittingly engaging in the meshes 9. The impressions 18 are designed as longitudinal channels, and they also are some kind of gears.

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for conveying articles, comprising:
   a grid belt including:
      a plurality of straight bar portions extending in a substantially transverse direction with respect to a conveying direction of the articles, and
      a plurality of meshes interconnecting said straight bar portions;
   a drive shaft including:
      a plurality of gear wheels being designed and arranged to engage said straight bar portions and including disk-like enlargements being located in a substantially transverse direction with respect to the conveying direction and in the region of said meshes, said disk-like enlargements being designed and arranged to support said meshes; and
   a motor being operatively connected to said drive shaft and being designed and arranged to drive said drive shaft and to move said grid belt in the conveying direction.

2. The apparatus of claim 1, wherein said disk-like enlargements are arranged on both sides of one gear wheel.

3. The apparatus of claim 2, wherein said gear wheel in its middle region includes a channel reducing its diameter.

4. The apparatus of claim 1, wherein said disk-like enlargement is only arranged at one side of said gear wheel.

5. The apparatus of claim 1, wherein said disk-like enlargements have an outer diameter being identical to a root diameter of said gear wheel.

6. The apparatus of claim 1, wherein said disk-like enlargements have an outer diameter being less than a root diameter of said gear wheel.

7. The apparatus of claim 1, wherein two gear wheels each including one enlargement are arranged only at one side in the region of said straight bar portion and of said meshes.

8. The apparatus of claim 7, wherein each of said two gear wheels is designed and arranged to be adjustable with respect to said other gear wheel in a direction transverse to the conveying direction.

9. The apparatus of claim 4, wherein two gear wheels each including one enlargement are arranged only at one side in the region of said straight bar portion and of said meshes.

10. The apparatus of claim 9, wherein each of said two gear wheels is designed and arranged to be adjustable with respect to said other gear wheel in a direction transverse to the conveying direction.

11. The apparatus of claim 5, wherein two gear wheels each including one enlargement are arranged only at one side in the region of said straight bar portion and of said meshes.

12. The apparatus of claim 11, wherein each of said two gear wheels is designed and arranged to be adjustable with respect to said other gear wheel in a direction transverse to the conveying direction.

13. The apparatus of claim 6, wherein two gear wheels each including one enlargement are arranged only at one side in the region of said straight bar portion and of said meshes.

14. The apparatus of claim 13, wherein each of said two gear wheels is designed and arranged to be adjustable with respect to said other gear wheel in a direction transverse to the conveying direction.

15. The apparatus of claim 1, wherein said enlargement at its circumference includes impressions being designed and arranged to support said meshes.

16. The apparatus of claim 1, wherein the articles to be transported are sweets to be covered with a chocolate mass.

17. A coating apparatus for coating sweets with a chocolate mass, comprising:
   a conveying apparatus including:
      a grid belt including:
         a plurality of straight bar portions extending in a substantially transverse direction with respect to a conveying direction of the articles, and
         a plurality of meshes interconnecting said straight bar portions; a drive shaft including:
            a plurality of gear wheels being designed and arranged to engage said straight bar portions and including disk-like enlargements being located in a substantially transverse direction with respect to the conveying direction and in the region of said meshes, said disk-like enlargements being designed and arranged to support said meshes; and
      a motor being operatively connected to said drive shaft and being designed and arranged to drive said drive shaft and to move said grid belt in the conveying direction.

18. The apparatus of claim 17, wherein said disk-like enlargements are arranged on both sides of one gear wheel.

19. The apparatus of claim 18, wherein said gear wheel in its middle region includes a channel reducing its diameter.

20. The apparatus of claim 17, wherein said disk-like enlargement is only arranged at one side of said gear wheel.

* * * * *